(12) United States Patent
Srinivasan

(10) Patent No.: US 6,352,157 B1
(45) Date of Patent: Mar. 5, 2002

(54) SHIPPING CONTAINER REUSABLE AS A HANGING FILE FOLDER CONTAINER

(76) Inventor: Ponniah Srinivasan, 20695 Settlers Point Pl., Sterling, VA (US) 20165-7398

( * ) Notice: Subject to any disclaimer, the term of this patent is extended or adjusted under 35 U.S.C. 154(b) by 0 days.

(21) Appl. No.: 09/657,624

(22) Filed: Sep. 8, 2000

(51) Int. Cl.$^7$ ................................................ B65D 85/00
(52) U.S. Cl. ..................................... 206/425; 206/756
(58) Field of Search ................................. 206/523, 425, 206/521, 448, 214, 215, 736, 756; 312/184; 211/46, 162

(56) References Cited

U.S. PATENT DOCUMENTS

| | | | |
|---|---|---|---|
| 3,614,185 A | * 10/1971 | Splan | .......................... 312/184 |
| 3,724,920 A | * 4/1973 | Beck | .......................... 312/184 |
| 3,910,411 A | 10/1975 | Deeren | |
| 4,624,380 A | 11/1986 | Wernette | |
| 4,844,262 A | 7/1989 | Patrick et al. | |
| 5,190,152 A | 3/1993 | Smith et al. | |
| 5,193,701 A | 3/1993 | Bush et al. | |
| 5,381,890 A | 1/1995 | Scobbie | |
| 5,494,161 A | 2/1996 | Herbst | |
| 5,622,309 A | 4/1997 | Matsuda et al. | |
| 5,779,129 A | 7/1998 | Herbst et al. | |
| 5,794,770 A | 8/1998 | Plomgren et al. | |
| 5,815,903 A | 10/1998 | Foster et al. | |
| 5,819,922 A | 10/1998 | Martin, Jr. | |
| 5,842,570 A | 12/1998 | Turnbull | |
| 5,887,782 A | 3/1999 | Mueller | |

* cited by examiner

*Primary Examiner*—Shian Luong
(74) *Attorney, Agent, or Firm*—Dinesh Agarwal, P.C.

(57) ABSTRACT

A shipping container reusable as a hanging file folder container includes a base panel, first and second laterally spaced side panels extending upwardly from the base panel, and third and fourth laterally spaced side panels extending upwardly from the base panel and extending between the first and second side panels. Each of the first, second, third and fourth panel includes inside and outside surfaces and a top edge portion, and together define an interior recess of the container. A first spacer member removably engages one of the first, second, third and fourth panels. The first spacer member has a predetermined width to maintain a clearance between one of the first, second, third and fourth panels and an article being shipped in the container. The first spacer member includes a channel for engaging the top edge portion of one of the panels. The shipping container may be converted to a hanging file folder container by mounting one, and preferably two spacer members over the corresponding top edge portions of two opposite panels and suspending hanging file folders therebetween.

13 Claims, 2 Drawing Sheets

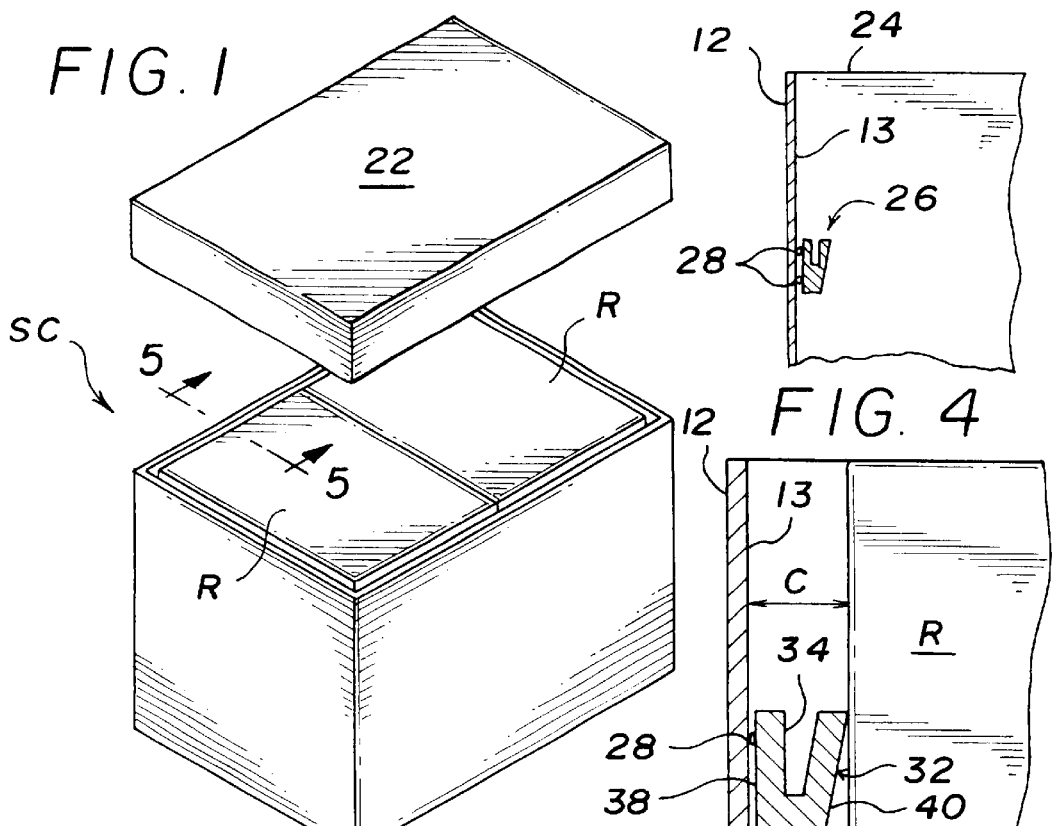
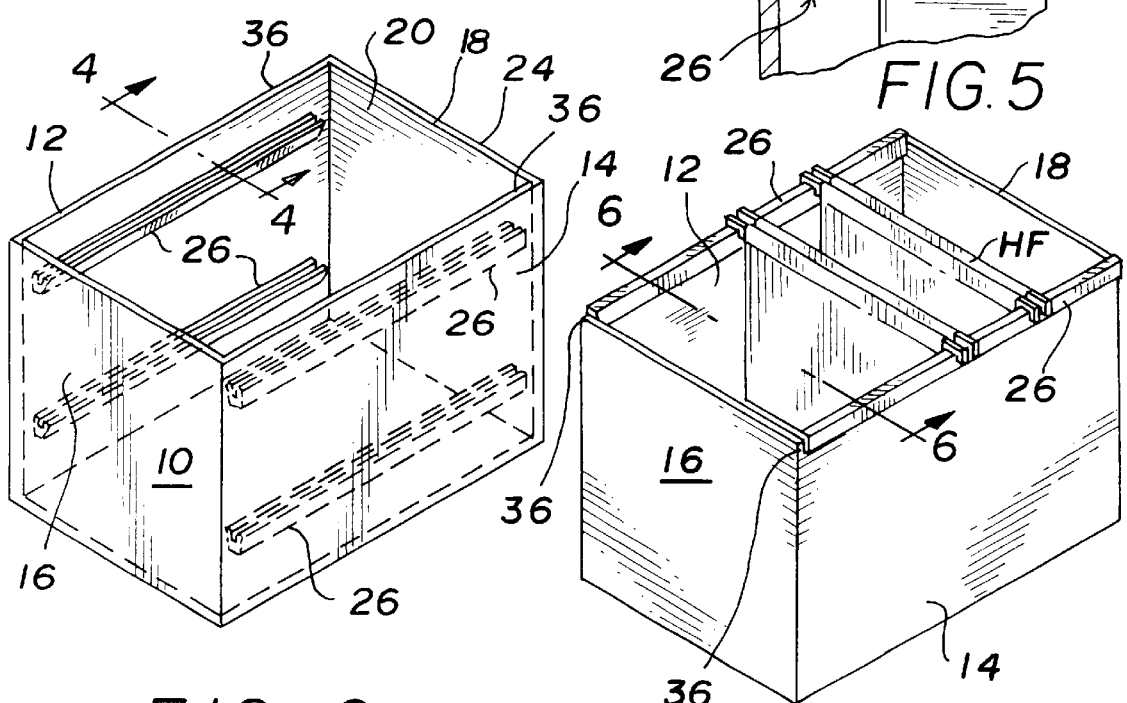

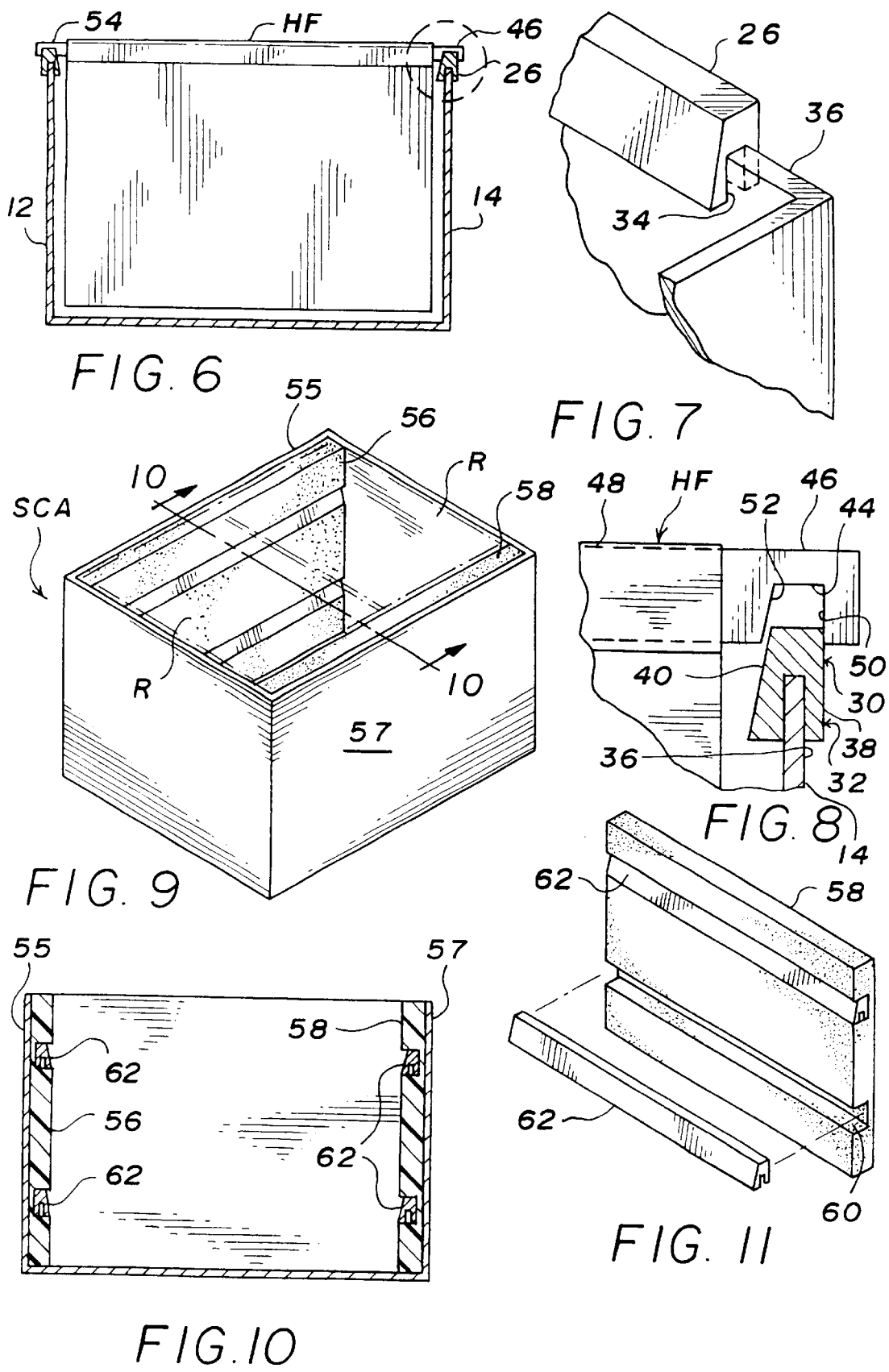

SHIPPING CONTAINER REUSABLE AS A HANGING FILE FOLDER CONTAINER

FIELD AND HISTORICAL BACKGROUND OF THE INVENTION

The present invention is directed to a shipping container, and more particularly to a container for shipping or packaging cut sheets of paper, which can be reused as a hanging file folder container after the sheets of paper have been removed.

The usefulness of the present invention will become easily apparent as we follow the life of cut sheets of paper. At the manufacturing facility, sheets of paper are cut from larger size paper rolls. A predetermined volume of the cut sheets of paper is packed with a sheet of wrapping paper. Several of these volumes of paper are packed into a carton for shipping. For a typical office use, 500 cut sheets are packed into a "ream", and ten reams are normally packaged in a container. The container is typically made of a corrugated fiber board or paper board material.

A business or home-office user normally purchases these boxes of cut paper, each typically containing ten reams. The cut sheets are taken from the container one ream at a time for use with office equipment, such as photocopiers, laser or ink-jet printers, and plain paper facsimile machines. Once all the reams of paper are exhausted, the container is usually discarded. It is not uncommon for a user, however, to remove all the reams from a container and stock them up in a convenience place, such as near a photocopy machine, etc. The discarded paper shipping boxes often become a significant part of the trash picked up at the end of the day, particularly in a office environment where the consumption of paper is high and a large number of boxes are purchased at one time.

As noted above, typically ten reams of cut paper are packed into a container. The dimensions of the most commonly used paper include 8.5"×11" or 8.5"×14". Currently, the industry practice is to provide a shipping container the interior volume of which is nearly identical to the overall volume of two five-ream stacks of paper placed side-by-side. As a result, the reams of paper are tightly packaged in a container, leaving almost no appreciable clearance between the container and the stacks of paper. This leads to significant problems in that it is very difficult to remove the reams without either causing damage to the paper or injuring a person's fingers. In particular, the absence of a clearance between the container and the reams makes it nearly impossible to sufficiently grasp a ream about its perimeter, which remains in tight engagement with the container walls, to take it out therefrom. Many users simply dismantle the container by pulling outwardly the panels to gain easy access to the reams. This practice is, however, not desirable, time-consuming, and completely destroys the container leaving no alternative for its reuse other than to discard it.

A large number of the cut sheets purchased in an office or the like environment, become documents, such as letters, reports, faxes, etc., that must be stored or filed. A popular method of filing or grouping the documents includes using hanging file folders. Hanging file folders generally have a pair of metal or plastic rods, that support a folded fiber board material into which documents and the like are stored and organized. The rods have notched ends which are received on support rods within office furniture, such as a filing cabinet, desk drawer, and a portable hanging file folder box.

Hanging file folders, for example those disclosed in U.S. Pat. No. 5,494,161 to Herbst, U.S. Pat. No. 5,842,570 to Turnbull, and U.S. Pat. No. 5,887,782 to Mueller, are usually manufactured as flat corrugated boards with fold line, cut lines, and flaps and shipped in an unassembled state to the consumer, thus minimizing the transport costs. The consumers usually assemble these boards into a box by quickly folding panels in a certain sequence, although the instructions accompanying these boxes may recommend using an adhesive for a sturdier construction. Hanging file folder boxes assembled in such a fashion are usually less sturdier than the cartons (used for shipping cut-sheets of paper) which are assembled in the factory with industrial adhesives.

In a typical office or a small business, several containers of cut sheets of paper are purchased on a regular basis and the containers are discarded after the cut sheets are removed therefrom. It is not unusual or uncommon for the same office or small business to separately purchase large quantities of hanging file folders to organize, store and archive the documents.

Various other examples of shipping or related types of containers and packages, and hanging file folder boxes, and the like are disclosed in U.S. Pat. Nos. 3,910,411; 4,624,380; 4,844,262; 5,190,152; 5,193,701; 5,381,890; 5,622,309; 5,779,129; 5,794,770; 5,815,903; and 5,819,922.

There remains a need in the industry, however, for a container which, after shipping, for example, the cut paper, may be converted to a hanging file folder container.

OBJECTS AND SUMMARY OF THE INVENTION

The principal object of the present invention is to provide a shipping container which is reusable as a hanging file folder container.

An object of the present invention is to provide a shipping container which promotes recycling of fiber board containers that are otherwise discarded.

Another object of the present invention is to provide a shipping container which is environment-friendly in that it is recycled or reused as a storage box.

An additional object of the present invention is to provide a shipping container which is reusable usually in the same end-user location and eliminates waste and therefore significantly reduces the usage of landfills that are otherwise in short supply.

Yet an additional object of the present invention is to provide a shipping container which leads to significant cost reduction in that separate purchase of hanging file folder containers is eliminated.

Still yet an additional object of the present invention is to provide a shipping container which can be very easily and economically reused by converting it into a hanging file folder container. The conversion is fast and can be quickly done without any special skill or training.

A further object of the present invention is to provide a shipping container which includes a clearance, preferably between two opposed side panels of the container and the articles, for example, paper, being shipped, thereby making it easy for a user to remove the articles from the container by inserting the hands in the clearance and grasping the articles.

In summary, the main object of the present invention is to provide a shipping container which can be reused as a hanging file folder container and therefore leads to significant cost savings and is environment and user-friendly.

In accordance with the present invention, a shipping container reusable as a hanging file folder container includes a base panel, first and second laterally spaced side panels extending upwardly from the base panel, and third and fourth laterally spaced side panels extending upwardly from the base panel and extending between the first and second side panels. Each of the first, second, third and fourth panel includes inside and outside surfaces and a top edge portion, and together define an interior recess of the container. A first spacer member removably engages one of the first, second, third and fourth panels. The first spacer member has a predetermined width to maintain a clearance between one of the first, second, third and fourth panels and an article being shipped in the container. The first spacer member includes a channel for engaging the top edge portion of one of the panels. The shipping container may be converted to a hanging file folder container by mounting one, and preferably two spacer members over the corresponding top edge portions of two opposite panels and suspending hanging file folders therebetween.

BRIEF DESCRIPTION OF THE DRAWINGS

The above and other objects, novel features and advantages of the present invention will become apparent from the following detailed description of the invention, as illustrated in the accompanying drawings, in which:

FIG. 1 is a perspective view of a shipping container of the present invention, shown packed with reams of paper for shipping;

FIG. 2 is a perspective view of the box of FIG. 1, shown without the paper and the container lid;

FIG. 3 is a view similar to FIG. 2, showing the container converted into a hanging file folder container;

FIG. 4 is a partial sectional view taken along line 4—4 of FIG. 2;

FIG. 5 is a partial enlarged sectional view taken along line 5—5 of FIG. 1;

FIG. 6 is a view taken along line 6—6 of FIG. 3;

FIG. 7 is a partial enlarged view of the box shown in FIG. 3, showing one of the spacer members mounted on the top edge portion of one of the panels;

FIG. 8 is an enlarged view showing the details of the portion encircled in FIG. 6, showing one end of a hanging file folder prior to being fully mounted over a spacer member;

FIG. 9 is a perspective view of an alternative embodiment of the shipping container of the present invention, showing reams of paper in phantom lines;

FIG. 10 is a sectional view taken along line 10—10 of FIG. 9, shown without the reams of paper; and FIG. 11 is a perspective view of one of the spacer member of FIG. 9, shown with one hanging file folder support member removed therefrom.

DETAILED DESCRIPTION OF THE INVENTION

As best shown in FIGS. 1–2, the shipping container SC of the invention is preferably a generally rectangularly shaped box which includes a base panel 10, two laterally spaced side panels 12 and 14 disposed generally opposite to each other, and two laterally spaced side panels 16 and 18 extending generally between the side panels 12 and 14. The side panels 12 and 14 are slightly longer than the side panels 16 and 18. The base panel 10 and the side panels 12, 14, 16 and 18, when erected upwardly extending from the base panel 10, define an interior recess 20. A lid 22 is provided to selectively close the top opening 24 of the shipping container SC.

The entire shipping container SC, including all of the panels 10, 12, 14, 16 and 18, and the lid 22, are made from a suitable material, such as a corrugated paper board, fiber board, or plastic material. As best shown in FIG. 1, the overall size of the container SC is such that the recess 20 accommodates two side-by-side stacks each including five reams R of 8.5"×11" or 8.5"×14" size cut paper. Particularly, the internal dimensions of the recess 20 would be designed to accommodate the reams R shipped in the container and the spacers 26. (Although the invention is equally applicable for international paper sizes, for example, size A4, for illustration, the paper sizes discussed herein correspond to those commonly used in the U.S. It is noted that the size of the container SC may further be varied to accommodate a different quantity or size of paper.) In particular, for 8.5"×11" size paper, the length and width dimensions of the container SC would be at least about 17"×12", providing two one-half inch clearances along both sides. Likewise, for 8.5"×14" size paper, the length and width dimensions of the container SC would be at least about 17"×15", providing two on-half inch clearances along both sides.

As best shown in FIGS. 2, 4 and 5, preferably a pair of vertically spaced spacer bars 26 is provided in the interior recess 20, on each of the side panels 12 and 14. As shown in FIG. 2, the spacer bars 26 are preferably disposed horizontally on the side panels 12 and 14. It is noted herewith that the spacer bars 26 may be disposed vertically or diagonally, and may alternatively be provided on the side panels 16 and 18. It is further noted that while two spacer bars 26 are provided on each of the panels 16 and 18, only one is necessary for each panel to attain the objective of the invention. Moreover, it is within the scope of the invention to provide two spacer bars only on one of the side panels 12, 14, 16 or 18.

As best shown in FIGS. 4–5, the spacer bars 26 are preferably mounted on the inside surfaces 13 of the panels 16 and 18, by thin glue strips 28 that allow easy removal thereof by a user to convert the shipping container SC into a hanging file folder container, as described below in more detail.

The length of each spacer bar 26 is selected so as to correspond to the inside-length of the side panel on which it will later be mounted to support hanging file folders HF. For instance, as illustrated in FIGS. 2–3, the lengths of the spacer bars 26 correspond to the lengths of side panels 12 and 14 on the top edge portions 36 of which they are mounted when the container SC is converted to a hanging file folder container. If desired, the spacer bars 26 may be shorter in length to be mounted on side panels 16 and 18, which are shorter in length than the panels 12 and 14.

As best shown in FIG. 5, each spacer bar 26 is wedge-shaped in cross-section and includes a somewhat narrow, tapered section 30 and a contiguous wider section 32. A channel 34 is cut into the wider section 32 and extends towards the tapered section 30. The width of the wider section 32 is selected so as to provide a predetermined amount of clearance C between an adjoining panel (12 in FIG. 5) and the reams of paper R in the shipping container SC. It is preferred that the clearance C be about one-half to one inch. The width of the channel 34 is selected to correspond to, or be slightly less than, the thickness of a panel such that when the spacer bar 26 is placed over the top edge portion 36 of any of the side panels, the spacer bar 26 is frictionally stabilized thereon (FIGS. 6–8).

As best shown in FIGS. 5 and 8, each spacer bar 26 includes a substantially straight or rectilinear side wall 38 and an opposed inclined side wall 40. The straight side wall 38 is positioned against the inside surface 13 of a panel (such as 12 in FIG. 5) when the shipping container SC is used for shipping purposes.

The tapered or wedge-shaped configuration of the spacer bar 26 is selected to conform with the tapered configuration of a notch 44, typically provided in an end portion 46 of a support rod 48 of a conventional hanging file folder HF (FIG. 8).

In particular, the notch 44 typically includes a straight wall 50 disposed in an opposed relationship to an inclined wall 52. As best shown in FIG. 8, the straight and inclined side walls 38 and 40 of the spacer bar 26 slidably engage the corresponding straight and inclined side walls 50 and 52, respectively, of the notch 44. In this manner, the tapered end portion 30 of the spacer bar 26 is slidably, yet firmly, received in the notch 44. As will be appreciated, a similar connection is made on the opposite end 54 of the hanging file folder HF (FIG. 6). These oppositely situated connections reinforce the top edge portions 36 of, for example, the panels 12 and 14, thereby providing a stronger support for the hanging file folder HF, when suspended in the container SC on the panels 12 and 14.

FIGS. 9–11 illustrate an alternative embodiment of the shipping container SCA of the invention. In this embodiment, preferably two spacer boards 56 and 58 are provided adjacent the side panels 55 and 57, respectively. (It is within the scope of the invention to provide only one spacer board of a sufficient thickness, i.e., one-half to one inch, adjacent only one panel.)

The spacer boards 56 and 58 are, preferably, made of a solid foam or the like material which is light-weight yet strong enough to sustain the pressure that may be exerted by the reams R during shipping. The spacer boards 56 and 58 generally correspond to the side panels 55 and 57 in length and width dimensions, and have a thickness that corresponds to a preselected clearance C, as noted above in connection with the embodiment shown in FIGS. 1–7. In other words, the boards 56 and 58 are provided between, for example, the side panels 55 and 57 of the shipping container SCA and the reams of cut sheets R. Although not necessary, the spacer boards 56 and 58 may be immobilized on the corresponding panels 55 and 57 by utilizing a small amount of glue or the like material to prevent unnecessary movement during shipping.

As best shown in FIGS. 10–11, each spacer board 56 and 58 includes, preferably two vertically spaced, horizontally extending recesses 60, each accommodating therein a hanging file folder support or mounting bar 62 therein. The mounting bar 62 is identical in configuration to the spacer bar 26 discussed above in connection with the first embodiment.

It is noted that while two mounting bars 62 are illustrated as being contained in each board 56 and 58, only a total of two mounting bars are required to convert the container SCA into a hanging file folder container, as described below. Also, the container SCA may be shipped with two sets of spacer bars for hanging file folders suitable for either letter-size (8.5"×11") or legal-size (8.5"×14") papers. The end-user may decide to use one set of spacer bars and discard the other.

It is noted that the spacer bars 26 of the first embodiment, shown in FIGS. 1–7, first provide clearances C during shipping of reams R, and then function as mounting bars to support hanging file folders HF when the container SC is converted to be reused as a hanging file folder container. On the other hand, the spacer boards 56 and 58 of the second embodiment, shown in FIGS. 9–11, provide sufficient, preselected clearances between the reams R and the container panels during shipping and when the reams R are being removed by a user. The boards 56 and 58 also provide means to accommodate and store mounting bars 62 during shipping and until the user is ready to convert the shipping box SCA to be reused as a hanging file folder container.

USE AND OPERATION

The use and operation of the shipping container SC illustrated in FIGS. 1–7 will first be described. The shipping container SC will either be available in an assembled or erected form shown in FIG. 2 (which is the most likely and preferred form), or be in a blank form that can be folded in a known manner to form a container. Whether in a blank form, or assembled as a container, one or more spacer bars 26 will either be already attached to the desired panels, or thin adhesive strips will be provided to attach them to the desired panels. Once assembled in the form shown in FIGS. 1–2, reams of cut paper R would be placed in side-by-side stacks for shipping.

A user, upon purchase of the boxed paper, would remove the reams R until the container SC is empty. In order to convert the shipping container SC into a hanging file folder container, the user would remove the spacer bars 26 from the panels of the container and place one each on, for example, each side panels 12 and 14, such that the channels 34 thereof firmly engage the top edge portions 36 thereof (FIG. 7). Hanging file folders HF may then be suspended in the shipping container SC by engaging the ends 46 and 54 with the tapered sections 30 of the spacer bars 26 (FIGS. 3 and 8).

The use of the alternative embodiment of the shipping container SCA shown in FIG. 9–11 will now be described. In order to easily remove the reams R from the container SCA, a user would first grab and slide out the spacer boards 56 and 58, to create clearances adjacent panels 55 and 57 to allow the user to insert hands to grasp and pull out the reams. Once all the reams R have been removed, the user would snap out two mounting bars 62 from the boards 56 and 58 and place one each on the corresponding top edge portions of, for example, the opposed side panels 55 and 57, in the manner described above. Once the mounting bars 62 are in place, the container SCA would be ready to receive the hanging file folders HF in the same manner as the first embodiment described above.

It is appreciated that hanging file folders are currently available in letter and legal sizes to accommodate 8.5"×11" (letter) and 8.5"×14" (legal) size paper. Thus, in a shipping container of the invention that is dimensioned to accommodate two side-by-side stacks of 8.5"×11" size paper, letter size hanging file folders would be used. On the other hand, in a shipping container of the invention that is dimensioned to accommodate two side-by-side stacks of 8.5"×14" size paper, legal size hanging file folders would be used. The shipping container of the invention may also be designated to contain five reams of paper (either letter or legal size) resulting in half of the length of the carton, shown in FIG. 1. It is also possible to design a shipping container for 8.5"×11" (letter) size paper such that the container may be converted to accommodate hanging file folders for either 8.5"×11" (letter) size or 8.5"×14" (legal) size paper. This may be achieved by stacking five reams of paper flatly on top of each other, and three reams of paper each standing on its edge and placed side-by-side to fill the container. This arrangement may be visualized by removing one of the two stacks of reams R in FIG. 1, and placing three reams vertically on edges, thus reducing the length of panels 12 and 14. The manufacturers may choose such a design if there is sufficient market demand. In this regard, it is noted that once the manufacturers of cut-sheet paper realize that they are catering to the hanging-file folder users also, they may provide alternative arrangements, or number of reams in a shipping container.

As can be seen from the above, the shipping container SC (or SCA) of the invention is first used to ship reams of cut paper and may then be very easily converted to be reused as a hanging file folder container by a user.

As can be further readily observed from the above, the clearance C created by the spacer bars 26 (FIG. 5) or by the boards 56 and 58 (FIGS. 9–11) allows a user to insert hands to manipulate and grasp the reams R to easily lift them out of the container without injuring the user's fingers or damaging the paper.

While this invention has been described as having preferred ranges, steps, materials, or designs, it is understood that it is capable of further modifications, uses and/or adaptations of the invention following in general the principle of the invention, and including such departures from the present disclosure, as those come within the known or customary practice in the art to which the invention pertains and as may be applied to the central features hereinbefore set forth, and fall within the scope of the invention and of the appended claims. It is further understood that the present invention is not limited to the claims appended hereto.

What I claim is:

1. A shipping container reusable as a hanging file folder container, comprising:
   a) a base panel;
   b) first and second laterally spaced side panels extending upwardly from said base panel;
   c) third and fourth laterally spaced side panels extending upwardly from said base panel and extending between said first and second side panels;
   d) each of said first, second, third and fourth panels including inside and outside surfaces and a top edge portion;
   e) said first, second, third and fourth panels defining an interior recess of the container;
   f) a first spacer member for removably engaging one of said first, second, third, and fourth panels;
   g) said first spacer member having a predetermined width to maintain a clearance between said one of said first, second, third and fourth panels and an article being shipped in the container;
   h) said first spacer member including a channel for engaging the top edge portion of one of said first, second, third and fourth panels upon removal of said first spacer member from said one of said first, second, third and fourth panels, to thereby reuse the container as a hanging file folder container;
   i) a second spacer member for removably engaging a second of said first, second, third and fourth panels disposed opposite to said one of said first, second, third and fourth panels;
   j) a third spacer member for removably engaging said one of said first, second, third and fourth panels; and
   k) a fourth spacer member for removably engaging said second of said first, second, third and fourth panels.

2. The container of claim 1, wherein:
   a) said first and second spacer members are disposed generally opposite to each other; and
   b) said third and fourth spacer members are disposed generally opposite to each other.

3. The container of claim 1, wherein:
   a) said first and third spacer members are vertically spaced from each other; and
   b) said second and fourth spacer members are vertically spaced from each other.

4. The container of claim 1, wherein:
   a) said first and second spacer members are mounted on the inside surfaces of the corresponding panels and are disposed a predetermined distance from the top edge portions thereof.

5. The container of claim 4, wherein:
   a) each of said first and second spacer members includes a channel; and
   b) each of said first and second spacer members includes an end portion disposed generally opposite to the corresponding channel for supporting the ends of a hanging file folder when said first and second spacer members are removed from their corresponding panels and mounted over the corresponding top edge portions of two of said first, second, third and fourth panels.

6. The container of claim 4, wherein:
   a) each of said first and second spacer members includes a channel;
   b) each of said first and second spacer members includes a tapered end portion and a wider end portion generally opposed to said tapered end portion;
   c) each said channel is provided in the corresponding wider end portion of said first and second spacer members; and
   d) the tapered end portions support the ends of a hanging file folder when said first and second spacer members are removed from their corresponding panels and mounted over the top edge portions of either said first and second panels or said third and fourth panels.

7. The container of claim 4, wherein:
   a) each of said first and second spacer members includes an inclined side wall and a generally rectilinear side wall; and
   b) said inclined and rectilinear side walls engage inclined and rectilinear edge portions of an end of a hanging file folder when said first and second spacer members are removed from their corresponding panels and mounted over the top edge portions of two of said first, second, third and fourth panels.

8. A method of converting a shipping container into a hanging file folder container, comprising the steps of:
   a) providing a shipping container, including:
      i) a base panel;
      ii) first and second laterally spaced side panels extending upwardly from said base panel;
      iii) third and fourth laterally spaced side panels extending upwardly from said base panel and extending between said first and second side panels;
      iv) each of said first, second, third and fourth panels including inside and outside surfaces and a top edge portion;
      v) first and second spacer members, at least one of which is in removable engagement with one of said first, second, third and fourth panels, one of said first and second spacer members having a width to maintain a distance between one of said first, second, third and fourth panels and an article being shipped in the container;

vi) said first and second spacer members each including a channel; and vii) said first and second spacer members being removably mounted in the shipping container on the inside surfaces of the first and second side panels, respectively;

b) removing said first and second spacer members from the shipping container;

c) mounting said first and second spacer members by engaging the channels thereof with the corresponding top edge portions of said first and second side panels; and d) suspending a hanging file folder by supporting the ends thereof over the first and second spacer members.

9. The method of claim 8, wherein: said first and second spacer members are mounted in the shipping container a predetermined distance from the top edge portions of the corresponding first and second side panels.

10. A shipping container reusable as a hanging file folder container, comprising:

a) a base panel;

b) first and second laterally spaced side panels extending upwardly from said base panel;

c) third and fourth laterally spaced side panels extending upwardly from said base panel and extending between said first and second side panels;

d) each of said first, second, third and fourth panels including inside and outside surfaces and a top edge portion;

e) said first, second, third and fourth panels defining an interior recess of the container;

f) a first spacer member for removably engaging one of said first, second, third, and fourth panels;

g) said first spacer member having a predetermined width to maintain a clearance between said one of said first, second, third and fourth panels and an article being shipped in the container;

h) said first spacer member including a channel for engaging the top edge portion of one of said first, second, third and fourth panels upon removal of said first spacer member from said one of said first, second, third and fourth panels, to thereby reuse the container as a hanging file folder container;

i) a second spacer member for removably engaging a second of said first, second, third and fourth panels disposed opposite to said one of said first, second, third and fourth panels; and j) said first and second spacer members being mounted on the inside surfaces of the corresponding panels and disposed a predetermined distance from the top edge portions thereof.

11. The container of claim 10, wherein:

a) each of said first and second spacer members includes a channel; and b) each of said first and second spacer members includes an end portion disposed generally opposite to the corresponding channel for supporting the ends of a hanging file folder when said first and second spacer members are removed from their corresponding panels and mounted over the corresponding top edge portions of two of said first, second, third and fourth panels.

12. The container of claim 10, wherein:

a) each of said first and second spacer members includes a channel;

b) each of said first and second spacer members includes a tapered end portion and a wider end portion generally opposed to said tapered end portion;

c) each said channel is provided in the corresponding wider end portion of said first and second spacer members; and d) the tapered end portions support the ends of a hanging file folder when said first and second spacer members are removed from their corresponding panels and mounted over the top edge portions of either said first and second panels or said third and fourth panels.

13. The container of claim 10, wherein:

a) each of said first and second spacer members includes an inclined side wall and a generally rectilinear side wall; and b) said inclined and rectilinear side walls engage inclined and rectilinear edge portions of an end of a hanging file folder when said first and second spacer members are removed from their corresponding panels and mounted over the top edge portions of two of said first, second, third and fourth panels.

* * * * *